(12) United States Patent
Goto et al.

(10) Patent No.: US 12,537,592 B2
(45) Date of Patent: Jan. 27, 2026

(54) WIRELESS COMMUNICATION SYSTEM, RELAY APPARATUS AND METHOD FOR GROUP TRANSMISSION WITHIN A SAME PERIOD

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 305 days.

(21) Appl. No.: 18/267,270

(22) PCT Filed: Dec. 24, 2020

(86) PCT No.: PCT/JP2020/048462
§ 371 (c)(1),
(2) Date: Jun. 14, 2023

(87) PCT Pub. No.: WO2022/137436
PCT Pub. Date: Jun. 30, 2022

(65) Prior Publication Data
US 2024/0056168 A1     Feb. 15, 2024

(51) Int. Cl.
H04B 7/185     (2006.01)
(52) U.S. Cl.
CPC ..................... H04B 7/185 (2013.01)
(58) Field of Classification Search
CPC ........ H04B 7/185; H04W 4/38; H04W 16/28; H04W 72/12
See application file for complete search history.

(56) References Cited

U.S. PATENT DOCUMENTS

| | | | | |
|---|---|---|---|---|
| 2009/0053994 A1* | 2/2009 | Senarath | ............... | H04B 7/2606 455/11.1 |
| 2009/0073914 A1* | 3/2009 | Sun | .................... | H04B 7/15521 370/315 |

(Continued)

FOREIGN PATENT DOCUMENTS

| | | |
|---|---|---|
| JP | 2014527377 A | 10/2014 |
| WO | WO-2019198239 A1 | 10/2019 |
| WO | WO-2020202817 A1 | 10/2020 |

OTHER PUBLICATIONS

Maung Sann Maw and Iwao Sasae, Efficient resource allocation for multiuser MIMO-OFDM uplink system to guarantee the proportional data rate fairness among users in a system, 2011 1st International Symposium on Access Spaces (ISAS), IEEE, 2011.

*Primary Examiner* — Afshawn M Towfighi
(74) *Attorney, Agent, or Firm* — Harness, Dickey & Pierce, P.L.C.

(57) ABSTRACT

A wireless communication system includes a plurality of communication apparatuses and a relay apparatus which is mobile, in which the relay apparatus includes a classification unit that groups the plurality of communication apparatuses by using position information of each of the plurality of communication apparatuses, a set determination unit that determines a set of communication apparatuses belonging to different groups that transmit and receive data within the same period, a transmission timing control unit that determines a transmission period for each determined set, and a plurality of antennas that receive data transmitted from the plurality of communication apparatuses in the determined transmission period for each determined set, and the plurality of communication apparatuses include a communication unit that transmits data to the relay apparatus within the transmission period for each set determined by the relay apparatus.

7 Claims, 3 Drawing Sheets

(56) References Cited

U.S. PATENT DOCUMENTS

2013/0072192 A1    3/2013  Xu et al.
2022/0173794 A1*  6/2022  Konishi ................ H04W 24/02
2023/0403635 A1* 12/2023  Kim .................. H04W 72/0446

* cited by examiner

WIRELESS COMMUNICATION SYSTEM, RELAY APPARATUS AND METHOD FOR GROUP TRANSMISSION WITHIN A SAME PERIOD

CROSS-REFERENCE TO RELATED APPLICATIONS

This application is a 371 National Stage of International Application No. PCT/JP2020/048462, filed on Dec. 24, 2020. The entire disclosures of the above applications are incorporated herein by reference.

TECHNICAL FIELD

The present invention relates to a wireless communication system, a relay device and a wireless communication method.

BACKGROUND ART

With the development of Internet of Things (IoT) technology, it has been studied to install IoT terminals including various sensors in various places. For example, it is also assumed that an IoT terminal is used for the purpose of collecting data in a place where it is difficult to install a base station, such as a buoy or a ship on the sea, or a mountainous area. A technique of performing wireless communication between an IoT terminal and an unmanned aerial vehicle (UAV) or a geostationary satellite has been proposed.

In a case where an unmanned aerial vehicle (UAV) or a geostationary satellite simultaneously communicates with a plurality of IoT terminals, as the number of IoT terminals increases, the probability that channels in a frequency band used by the respective IoT terminals overlap increases. As a result, it is also assumed that another device becomes an interference source and communication cannot be efficiently performed. In order to avoid such a problem, it is conceivable to apply a conventionally proposed technique related to simultaneous timing control of uplink multiple input multiple output (MIMO) (refer to, for example, Non Patent Literature 1). In the technique disclosed in Non Patent Literature 1, allocation of users for simultaneous transmission is performed on the basis of CSI (Channel State Information) of each user.

CITATION LIST

Non Patent Literature

Non Patent Literature 1: Maung, Sann Maw, and Sasase Iwao, "Efficient resource allocation for multiuser MIMO-OFDM uplink system to guarantee the proportional data rate fairness among users in a system", 2011 1st International Symposium on Access Spaces (ISAS). IEEE, 2011.

SUMMARY OF INVENTION

Technical Problem

The technique disclosed in Non Patent Literature 1 is considerably effective in a case where the number of terminals is small to some extent. However, cost performance is reduced in a terminal that is installed in an enormous number and has few communication opportunities, such as an IoT terminal. Therefore, a technique for suppressing interference of an uplink signal according to a simple method is required.

In view of the above circumstances, an object of the present invention is to provide a technique capable of suppressing interference between uplink signals according to a simple method.

Solution to Problem

According to an aspect of the present invention, there is provided a wireless communication system including a plurality of communication apparatuses; and a relay apparatus which is mobile, in which the relay apparatus includes a classification unit that groups the plurality of communication apparatuses by using position information of each of the plurality of communication apparatuses, a set determination unit that determines a set of communication apparatuses belonging to different groups that transmit and receive data within the same period, a transmission timing control unit that determines a transmission period for each determined set, and a plurality of antennas that receive data transmitted from the plurality of communication apparatuses in the determined transmission period for each determined set, and the plurality of communication apparatuses include a communication unit that transmits data to the relay apparatus within the transmission period for each set determined by the relay apparatus.

According to another aspect of the present invention, there is provided a relay apparatus in a wireless communication system including a plurality of communication apparatuses and a relay apparatus which is mobile, the relay apparatus including a classification unit that groups the plurality of communication apparatuses by using position information of each of the plurality of communication apparatuses; a set determination unit that determines a set of communication apparatuses belonging to different groups that transmit and receive data within the same period; a transmission timing control unit that determines a transmission period for each determined set; and a plurality of antennas that receive data transmitted from the plurality of communication apparatuses in the determined transmission period for each determined set.

According to still another aspect of the present invention, there is provided a wireless communication method in a wireless communication system including a plurality of communication apparatuses and a relay apparatus which is mobile, the method including causing the relay apparatus to group the plurality of communication apparatuses by using position information of each of the plurality of communication apparatuses; causing the relay apparatus to determine a set of communication apparatuses belonging to different groups that transmit and receive data within the same period; causing the relay apparatus to determine a transmission period for each determined set; causing the plurality of communication apparatuses to transmit data to the relay apparatus within the transmission period for each set determined by the relay apparatus; and causing the relay apparatus to receive the data transmitted from the plurality of communication apparatuses in the determined transmission period for each set.

Advantageous Effects of Invention

According to the present invention, it is possible to suppress interference between uplink signals according to a simple method.

DESCRIPTION OF EMBODIMENTS

Hereinafter, embodiments of the present invention will be described in detail with reference to the drawings.

Figure 1:
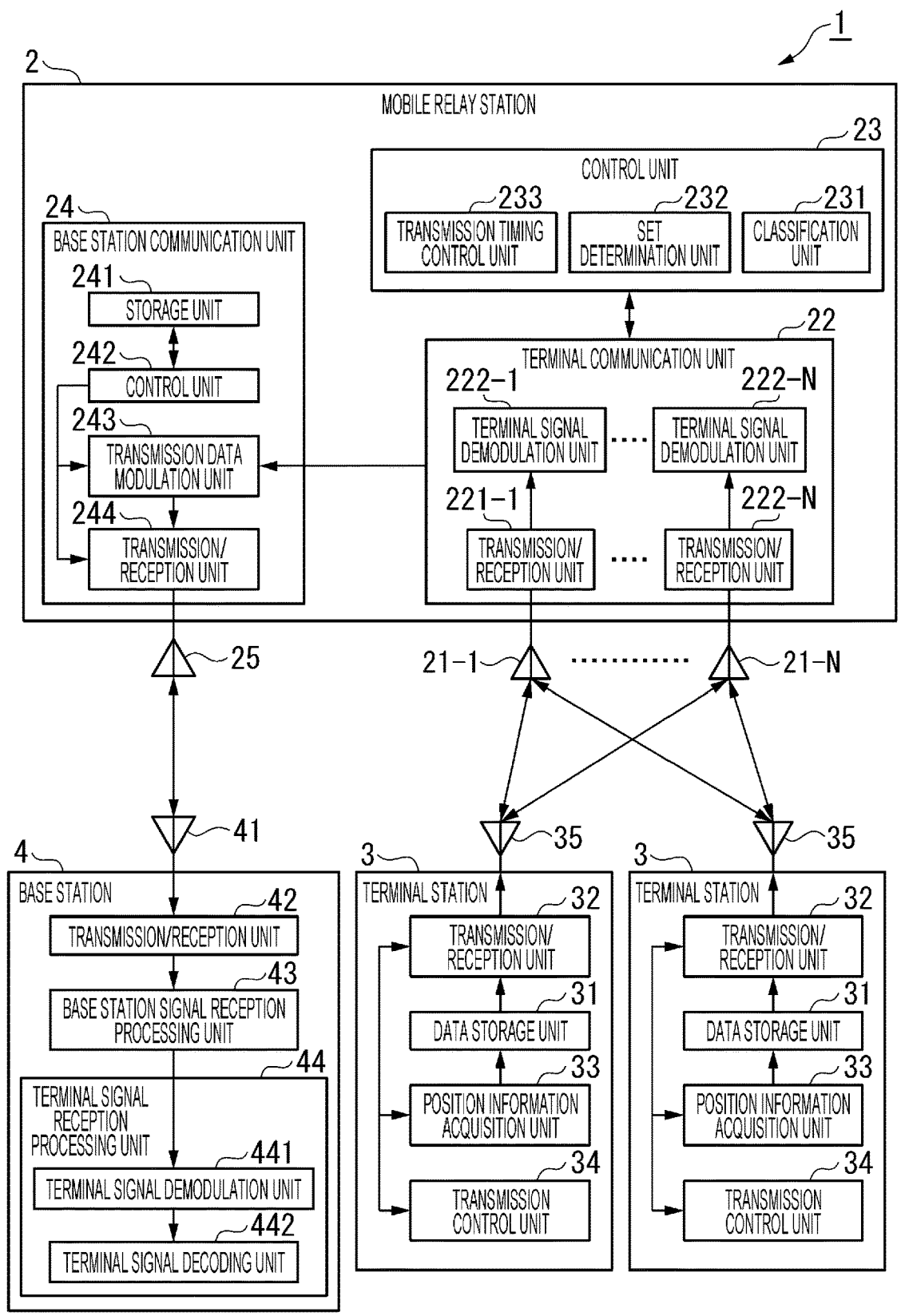
FIG. 1 is a configuration diagram of a wireless communication system according to an embodiment.

FIG. 1 is a configuration diagram of a wireless communication system 1 according to an embodiment. The wireless communication system 1 includes a mobile relay station (relay apparatus) 2, a plurality of terminal stations (a plurality of communication apparatuses) 3, and a base station 4. The number of each of the mobile relay stations 2, the terminal stations 3, and the base stations 4 included in the wireless communication system 1 is freely selected. It is assumed that the number of terminal stations 3 is large.

The mobile relay station 2 is an example of a relay device mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. The mobile relay station 2 receives data transmitted from each of the plurality of terminal stations 3 by using a radio signal while moving above the earth. The mobile relay station 2 wirelessly transmits each received piece of data to the base station 4. Hereinafter, a signal transmitted from the mobile relay station 2 to the terminal station 3 and the base station 4 will be referred to as downlink signals.

The mobile relay station 2 controls transmission timings of the plurality of terminal stations 3 on the basis of position information of each of the plurality of terminal stations 3. Specifically, the mobile relay station 2 groups the terminal stations 3 on the basis of the position information of each of the plurality of terminal stations 3, and controls the transmission timings such that the terminal stations 3 belonging to the same group do not transmit data within the same period. A specific method will be described later. The transmission timing represents a period during which transmission from the terminal station 3 to the mobile relay station 2 can be performed.

The terminal station 3 collects data such as environmental data detected by the sensor and wirelessly transmits the collected data to the mobile relay station 2. For example, in a case where an instruction for a transmission timing is given from the mobile relay station 2, the terminal station 3 wirelessly transmits the collected data to the mobile relay station 2 at the transmission timing for which the instruction is given. The terminal station 3 is, for example, an IoT terminal. In the same drawing, only two terminal stations 3 are illustrated. Hereinafter, a signal transmitted from the terminal station 3 to the mobile relay station 2 will be referred to as a terminal uplink signal.

The base station 4 receives data collected by the terminal station 3 from the mobile relay station 2.

The terminal station 3 and the base station 4 are installed at specific positions on the earth such as on the ground or on the sea.

It is conceivable to use a relay device mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow.

Furthermore, drones require batteries and HAPS require solar panels. In the present embodiment, the mobile relay station 2 is mounted on the LEO satellite. Therefore, in addition to keeping the link budget within a limit, the LEO satellite has no air resistance and consumes less fuel because it orbits outside the atmosphere. In addition, a footprint is also larger than that in a case where the relay station is mounted on the drone or the HAPS.

The mobile relay station 2 mounted on the LEO satellite communicates with a large number of terminal stations 3 installed on the ground. Depending on installation positions of the terminal stations 3, many terminal stations 3 may be installed densely. In such a case, in a case where a plurality of terminal stations 3 disposed at close positions transmit data to the mobile relay station 2 within the same period in response to an instruction from the mobile relay station 2, the terminal uplink signals are more likely to collide with each other.

Although a technique for simultaneous timing control of uplink MIMO has also been proposed as in Non Patent Literature 1, a large number of terminal stations 3 are expected to be installed, and cost performance is low in IoT terminals having few communication machines. Therefore, the mobile relay station 2 of the present embodiment acquires position information of each terminal station 3, and groups the plurality of terminal stations 3 on the basis of the acquired position information. The mobile relay station 2 determines transmission timings such that the terminal stations 3 belonging to the same group have different transmission timings, and determines transmission timings such that the terminal stations 3 belonging to different groups have the same transmission timing. Here, it is desirable that a distance between the terminal stations 3 belonging to different groups and transmitting data at the same timing is long. For example, the terminal stations 3 belonging to different groups and transmitting data at the same timing are separated by a distance at which the channel correlation is assumed to be equal to or less than the threshold value.

The mobile relay station 2 determines a transmission timing of each terminal station 3 for each group, and generates transmission timing information including information regarding the determined transmission timing and identification information for identifying the terminal station 3 to transmit data at the determined transmission timing. The mobile relay station 2 transmits the generated transmission timing information to the terminal station 3.

Each terminal station 3 transmits data to the mobile relay station 2 at the transmission timing included in the obtained transmission timing information.

A configuration of each device will be described.

The mobile relay station 2 includes N antennas 21 (where N is an integer of 2 or more), a terminal communication unit 22, a control unit 23, a base station communication unit 24, and a plurality of antennas 25. The N antennas 21 will be referred to as antennas 21-1 to 21-N, respectively.

The terminal communication unit 22 includes N transmission/reception units 221 and N terminal signal demodulation units 222. The N transmission/reception units 221 will be referred to as transmission/reception units 221-1 to 221-N. The N terminal signal demodulation units 222 will be referred to as terminal signal demodulation units 222-1 to 222-N.

The transmission/reception unit 221-*n* (where n is an integer of 1 or more and N or less) receives a terminal uplink signal via the antenna 21-*n*.

The terminal signal demodulation unit 222-*n* (where n is an integer of 1 or more and N or less) demodulates the terminal uplink signal received by the transmission/reception unit 221-*n*, and outputs a demodulation result to the control unit 23 or the base station communication unit 24. For example, in a case where the data collected by the sensor is included in the demodulation result, the terminal signal demodulation unit 222-*n* outputs the demodulation result to the base station communication unit 24. For example, in a case where at least the position information is included in the demodulation result, the terminal signal demodulation unit 222-*n* outputs the demodulation result to the control unit 23.

The demodulation performed by the terminal signal demodulation unit 222-*n* includes, for example, frequency conversion for converting a radio frequency (RF) signal received by the transmission/reception unit 221-*n* into a baseband signal, and frame detection for detecting uplink signals transmitted from the terminal station 3 and the reference station 5. For example, in a case where the terminal signal demodulation unit 222-*n* performs digital processing, the terminal signal demodulation unit 222-*n* performs analog-to-digital conversion.

The control unit 23 includes a processor such as a central processing unit (CPU) and a memory. The control unit 23 realizes functions of a classification unit (classifier) 231, a set determination unit (set determiner) 232, and a transmission timing control unit (transmission timing controller) 233 by executing a program. Some of these functions (for example, some of the classification unit 231, the set determination unit 232, and the transmission timing control unit 233) need not be installed in the mobile relay station 2 in advance, and may be realized by installing an additional application program in the mobile relay station 2.

The classification unit 231 groups the terminal stations 3 on the basis of the position information acquired from each of the terminal stations 3.

The set determination unit 232 determines a set of terminal stations 3 that perform data transmission within the same period between the groups grouped by the classification unit 231. The terminal stations 3 belonging to different sets do not perform data transmission within the same period.

The transmission timing control unit 233 determines a transmission timing for each set such that a transmission timing differs for each set determined by the set determination unit 232. That is, the transmission timing control unit 233 determines the transmission timing such that the terminal stations 3 belonging to the same group do not perform data transmission within the same period.

The base station communication unit 24 transmits received waveform information to the base station 4 by using a downlink signal in any wireless communication method. The base station communication unit 24 includes a storage unit 241, a control unit 242, a transmission data modulation unit 243, and a transmission/reception unit 244.

The storage unit 241 stores a transmission start timing calculated in advance on the basis of orbit information of the LEO satellite on which the mobile relay station 2 is mounted and a position of the base station 4. The LEO orbit information is information from which a position, a velocity, a movement direction, and the like of the LEO satellite at any time can be obtained. The transmission time may be represented by, for example, an elapsed time from the transmission start timing.

The control unit 242 controls the transmission data modulation unit 243 and the transmission/reception unit 244 such that the received waveform information is transmitted to the base station 4 at the transmission start timing stored in the storage unit 241.

The transmission data modulation unit 243 modulates the received waveform information output from the control unit 242 to generate a base station downlink signal.

The transmission/reception unit 244 converts the base station downlink signal from an electrical signal into a radio signal and transmits the radio signal from the antenna 25.

The terminal station 3 includes a data storage unit 31, a transmission/reception unit (communicator) 32, a position information acquisition unit 33, a transmission control unit 34, and an antenna 35. The terminal station 3 may include a plurality of antennas 35.

The data storage unit 31 stores sensor data and position information.

The transmission/reception unit 32 communicates with the mobile relay station 2. For example, when receiving the downlink signal transmitted from the mobile relay station 2, the transmission/reception unit 32 reads the position information from the data storage unit 31. The transmission/reception unit 32 wirelessly transmits, from the antenna 35, a terminal uplink signal in which identification information of the terminal station 3 is added to the read position information. For example, the transmission/reception unit 32 receives transmission timing information transmitted from the mobile relay station 2 and outputs the transmission timing information to the transmission control unit 34. For example, the transmission/reception unit 32 reads sensor data from the data storage unit 31 as terminal transmission data in response to an instruction from the transmission control unit 34. The transmission/reception unit 32 wirelessly transmits the terminal uplink signal in which the read terminal transmission data is set from the antenna 35.

The transmission/reception unit 32 transmits and receives signals by using low power wide area (LPWA), for example. LPWA includes LoRaWAN (registered trademark), Sigfox (registered trademark), Long Term Evolution for Machines (LTE-M), Narrow Band (NB)-IoT, and the like, but any wireless communication method may be used. The transmission/reception unit 32 may perform transmission/reception with another terminal station 3 by using time division multiplexing, orthogonal frequency division multiplexing (OFDM), or the like. The transmission/reception unit 32 may perform beam formation of signals transmitted from the plurality of antennas 35 according to a method determined in advance in the wireless communication method to be used.

The position information acquisition unit 33 acquires position information. For example, the position information acquisition unit 33 actively or passively acquires the position information. Actively acquiring the position information means acquiring position information at a predetermined timing (for example, every few minutes or every few hours). Passively acquiring the position information means acquiring the position information when a downlink signal transmitted from the mobile relay station 2 is received. In the following description, a configuration in which the position information acquisition unit 33 actively acquires position information will be described. The position information acquisition unit 33 may acquire the position information by using a global positioning system (GPS) or may acquire the position information by using another method.

The transmission control unit 34 causes the transmission/reception unit 32 to transmit the sensor data stored in the data storage unit 31 at a timing included in the transmission timing information transmitted from the mobile relay station 2.

The base station 4 includes an antenna 41, a transmission/reception unit 42, a base station signal reception processing unit 43, and a terminal signal reception processing unit 44. The transmission/reception unit 42 converts a terminal downlink signal received by the antenna 41 into an electrical signal. The base station signal reception processing unit 43 demodulates and decodes the received signal converted into the electrical signal by the transmission/reception unit 42 to obtain received waveform information. The base station signal reception processing unit 43 outputs the received waveform information to the terminal signal reception processing unit 44.

The terminal signal reception processing unit 44 performs a reception process on a terminal uplink signal indicated by the received waveform information. In this case, the terminal signal reception processing unit 44 performs a reception process according to the wireless communication method used for transmission by the terminal station 3 to acquire terminal transmission data. The terminal signal reception processing unit 44 includes a terminal signal demodulation unit 441 and a terminal signal decoding unit 442.

The terminal signal demodulation unit 441 demodulates the waveform data and outputs a symbol obtained through the demodulation to the terminal signal decoding unit 442. The terminal signal demodulation unit 441 may demodulate a signal indicated by the waveform data after performing a process of compensating for the Doppler shift of the terminal uplink signal received by the antenna 21 of the mobile relay station 2. The Doppler shift applied to the terminal uplink signal received by the antenna 21 is calculated in advance on the basis of a position of the terminal station 3 and the orbit information of the LEO on which the mobile relay station 2 is mounted. The terminal signal decoding unit 442 decodes the symbol demodulated by the terminal signal demodulation unit 441, and obtains the terminal transmission data transmitted from terminal station 3.

An operation of the wireless communication system 1 will be described.

Figure 2:
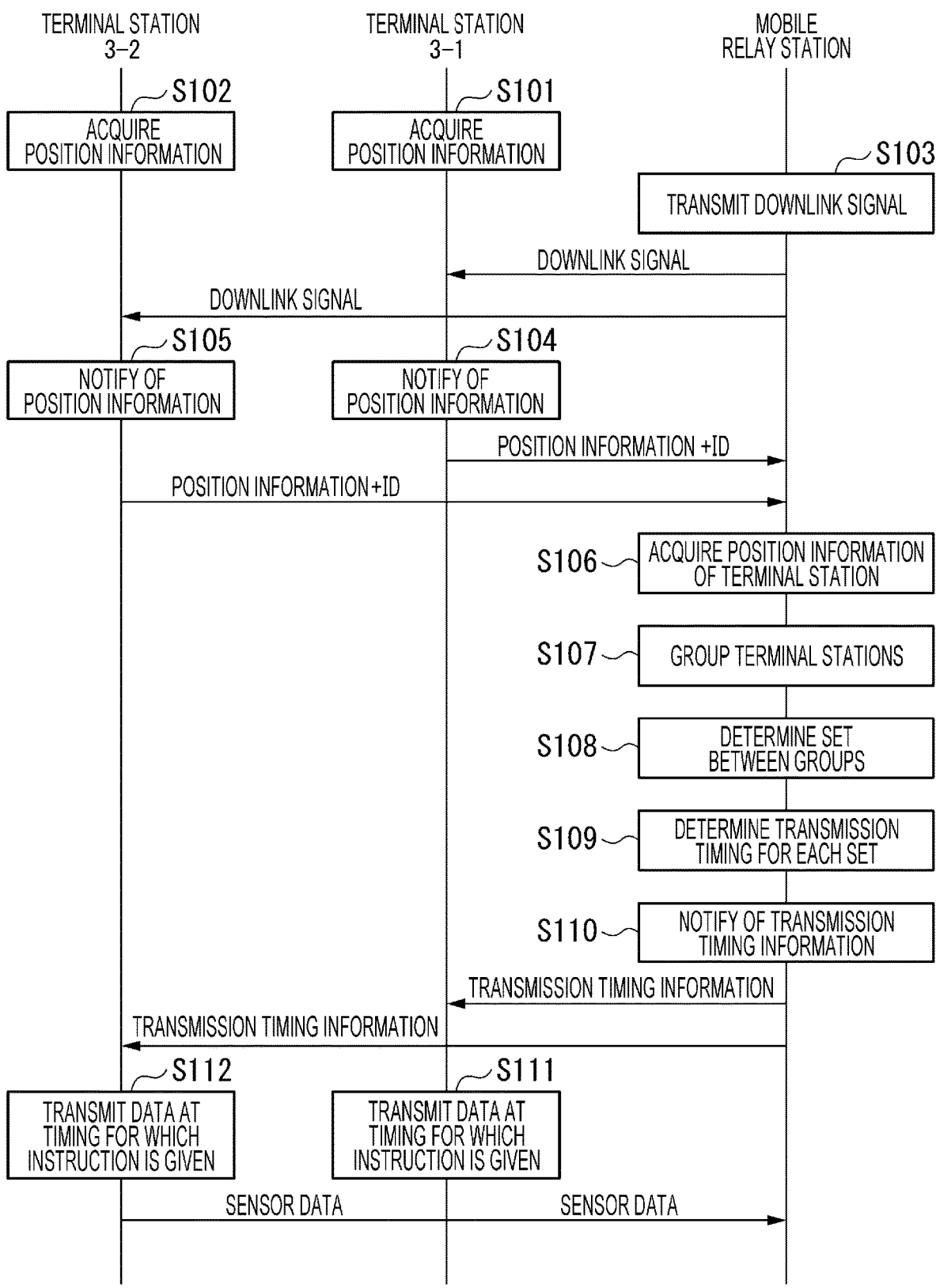
FIG. 2 is a sequence diagram illustrating a flow of a transmission timing control process of the wireless communication system according to the embodiment.

FIG. 2 is a sequence diagram illustrating a flow of a transmission timing control process of the wireless communication system 1 according to the embodiment. In the description of FIG. 2, a case where the wireless communication system 1 includes two terminal stations 3 (a terminal station 3-1 and a terminal station 3-2) will be described as an example. In order to distinguish the functional units of the two terminal stations 3-1 and 3-2, a branch number "–1" or "–2" is added to each functional unit. In the following description, a process in FIG. 2 will be described as being executed at a predetermined timing. The predetermined timing may be a timing at which a predetermined time has come. The predetermined time is a time at which the mobile relay station 2 is located near the terminal station 3. The process in FIG. 2 may be executed at a timing at which the terminal station 3 receives a downlink signal from the mobile relay station 2.

The position information acquisition unit 33-1 of the terminal station 3-1 acquires position information (step S101). The terminal station 3-1 stores the acquired position information in the data storage unit 31-1. The position information acquisition unit 33-2 of the terminal station 3-2 acquires position information similarly to the terminal station 3-1 (step S102). The terminal station 3-2 stores the acquired position information in the data storage unit 31-2.

The mobile relay station 2 transmits downlink signals within the communication range of the transmission/reception units 221-1 to 221-N via the transmission/reception units 221-1 to 221-N. Here, the downlink signals transmitted by the mobile relay station 2 include information indicating that transmission in the terminal station 3 is permitted. In a case where the terminal station 3 is located within the communication range of the transmission/reception units 221-1 to 221-N, the terminal station 3 receives the downlink signals. Here, it is assumed that the terminal stations 3-1 and 3-2 are located within the communication range of any of the transmission/reception units 221-1 to 221-N. The terminal stations 3-1 and 3-2 receive the downlink signals transmitted from the mobile relay station 2.

In a case where the downlink signal transmitted from the mobile relay station 2 include the information indicating that transmission in the terminal station 3 is permitted, the transmission/reception unit 32-1 wirelessly transmits, from the antenna 35-1, a terminal uplink signal in which the identification information of the terminal station 3-1 is added to the position information stored in the data storage unit 31-1 (step S104).

In a case where the downlink signal transmitted from the mobile relay station 2 includes information indicating that transmission in the terminal station 3 is permitted, the transmission/reception unit 32-2 wirelessly transmits, from the antenna 35-2, a terminal uplink signal in which the identification information of the terminal station 3-2 is added to the position information stored in the data storage unit 31-2 (step S105).

Each of the transmission/reception units 221-1 to 221-N receives the terminal uplink signal transmitted from the terminal station 3. The terminal signal demodulation units 222-1 to 222-N demodulate the terminal uplink signals received by the transmission/reception units 221-1 to 221-N, and output demodulation results to the control unit 23. The classification unit 231 acquires the position information of the terminal stations 3-1 and 3-2 from the demodulation results (step S106). Here, the classification unit 231 acquires the position information of the two terminal stations 3, but the classification unit 231 acquires the position information during a predetermined period from a time point at which the first position information is acquired. This is because, in a case where there are a large number of terminal stations 3 that have received the downlink signals transmitted from the mobile relay station 2, it may take time to acquire the position information from each terminal station 3 (for example, signal collision between the terminal stations 3).

Figure 3:
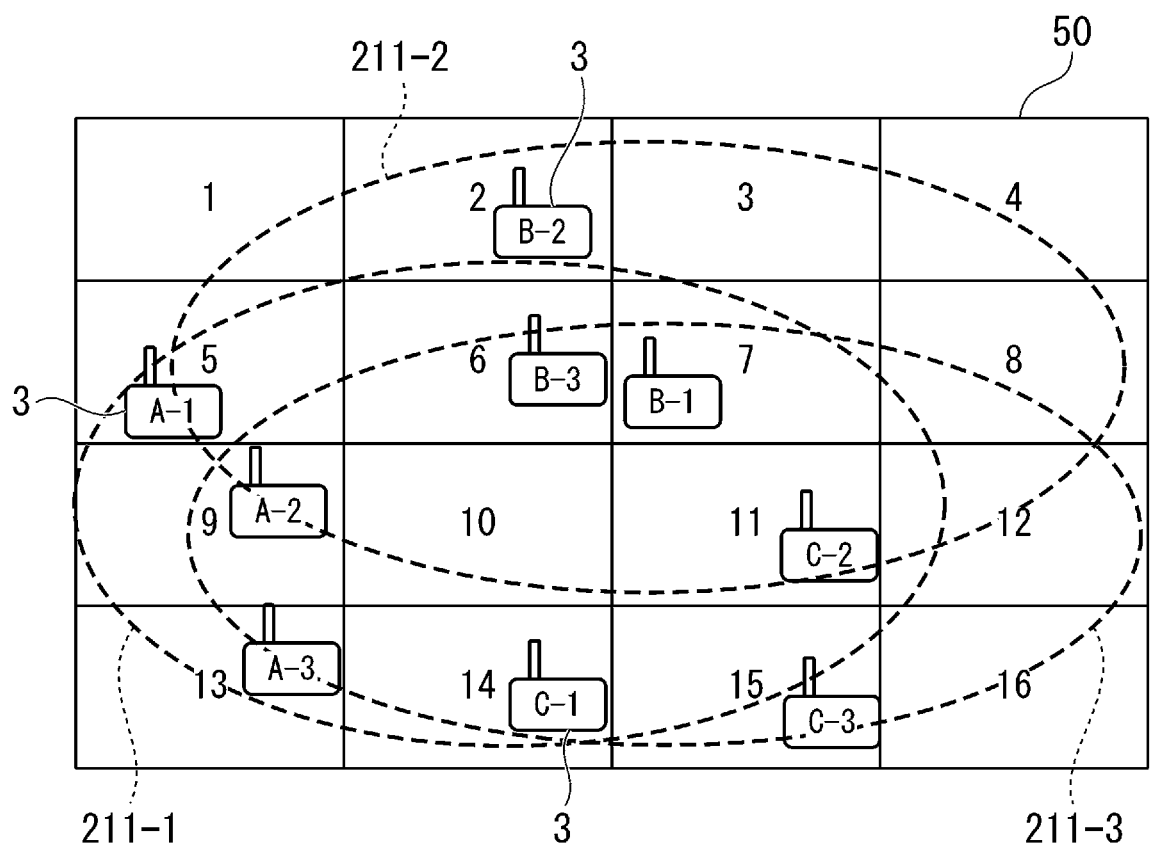
FIG. 3 is a diagram for describing grouping and set determination processes according to the embodiment.

The classification unit 231 groups the terminal stations 3 on the basis of the acquired position information of each terminal station 3 (step S107). Grouping of the terminal stations 3 will be described with reference to FIG. 3. In FIG. 3, circles 211-1 to 211-3 represent communicable ranges of the antennas 21. First, the classification unit 231 sets an area 50 as illustrated in FIG. 3 on the basis of map information of a place where the mobile relay station 2 is located at the time of processing. The map information includes regional information (for example, in the case of Japan, information regarding a city, a ward, a town, or a village) in addition to latitude and longitude. The map information may be stored in, for example, a memory (not illustrated).

A size of the area 50 may be a range including all communicable ranges of the respective antennas 21. Next, the classification unit 231 divides the area 50 by a size of a predetermined range. Consequently, a plurality of divided areas (hereinafter referred to as "divided areas") are generated. FIG. 3 illustrates an example in which the classification unit 231 divides the area 50 into 16 grids. A size of the area 50 to be divided may be determined on the basis of the following division condition.

(Division Condition)

A distance between divided areas across at least one divided area is a distance at which a channel correlation is equal to or less than a threshold value.

The division condition changes according to a resolution of the antenna 21 of the mobile relay station 2. Referring to FIG. 3, the classification unit 231 divides the area 50 such that, for example, a distance between a first divided area and a second divided area across a certain divided area is a distance at which a correlation of channels decreases by a threshold value or more. The distance between the divided areas may be a distance from a boundary (for example, a boundary between the first divided area and the certain divided area) to a boundary (for example, a boundary between the certain divided area and the second divided area) between the divided areas. According to this division condition, even if the terminal station 3 located in the first divided area and the terminal station 3 located in the second divided area transmit data within the same period, a correlation of channels is low, and thus the mobile relay station 2 can easily separate the channels.

Next, the classification unit 231 virtually disposes the terminal station 3 at the position on the area 50 indicated by each piece of acquired position information. The virtual disposition does not mean that the actual terminal station 3 is actually disposed on the area 50, but means that information (for example, the icon) indicating that the terminal station 3 is located is disposed on the area 50. Consequently, as illustrated in FIG. 3, information indicating a section indicating a divided area and information indicating a disposition position of the terminal station 3 are superimposed on the area 50. In FIG. 3, nine terminal stations 3 are illustrated for convenience of description.

The classification unit 231 groups the terminal stations 3. For example, the classification unit 231 groups the terminal stations 3 located in any one of the divided areas "5", "9", and "13" into an A group, the terminal stations 3 located in any one of the divided areas "2", "6", and "7" into a B group, and the terminal stations 3 located in any one of the divided areas "11", "14", and "15" into a C group. Which divided area is set as one group may be set in advance or grouping may be performed for each region. By performing grouping as described above, it is possible to suppress a plurality of adjacent terminal stations 3 from performing simultaneous transmission.

As described above, the classification unit 231 groups the plurality of terminal stations 3 according to the distance between the terminal stations 3. More specifically, the classification unit 231 performs grouping by classifying the plurality of terminal stations 3 in which the distance between the terminal stations 3 is less than a threshold value into the same group, and classifying the plurality of terminal stations 3 in which the distance between the terminal stations 3 is equal to or more than the threshold value into different groups. In the example of the present embodiment, three beams are described as an example, and thus are classified into three groups, but the number of groups to be classified can be changed as appropriate according to the number of beams.

The set determination unit 232 determines a set of terminal stations 3 to perform data transmission at the same timing between groups (step S108). Specifically, the set determination unit 232 extracts one terminal station 3 from each group, the terminal stations 3 having a certain distance between the terminal stations 3 that perform data transmission within the same period, and determines each extracted terminal station 3 as one set. The terminal stations 3 belonging to the same group are assumed to have a high channel correlation because the distance between the terminal stations 3 is short. Thus, the set determination unit 232 extracts one terminal station 3 from each group. The fact that the terminal stations 3 are separated from each other to some extent means that, for example, the terminal stations 3 are separated from each other by a distance of one or more divided areas. Not all the terminal stations 3 are necessarily separated by one or more divided areas. Thus, in a case where the terminal stations 3 are not separated by one or more divided areas, the set determination unit 232 may extract the terminal stations 3 separated by a predetermined distance or more between the groups. Here, as an example, the terminal stations 3 forming one set are associated with three divided areas. For example, the set determination unit 232 associates the divided areas with a triangular shape formed by skipping one divided area.

To describe the example in FIG. 3, the set determination unit 232 creates sets of (1, 3, 10), (2, 4, 11), (5, 7, 14), (6, 8, 15), (2, 9, 11), (3, 10, 12), (6, 13, 15), and (7, 14, 16) on the basis of the divided areas 1 to 16. Here, the number in parentheses represents a number of the divided area. Consequently, it is possible to create a set including divided areas separated by a distance of one or more divided areas. As a result, for example, the set determination unit 232 can determine the terminal station 3 of the A group (A-1 in FIG. 3) located in the divided area "5", the terminal station 3 of the B group (B-1 in FIG. 3) located in the divided area "7", and the terminal station 3 of the C group (C-1 in FIG. 3) located in the divided area "14" as one set.

Similarly, the set determination unit 232 can determine the terminal station 3 of the A group (A-2 in FIG. 3) located in the divided area "9", the terminal station 3 of the B group (B-2 in FIG. 3) located in the divided area "2", and the terminal station 3 of the C group (C-2 in FIG. 3) located in the divided area "11" as one set. The set determination unit 232 can determine the terminal station 3 of the group A (A-3 in FIG. 3) located in the divided area "13", the terminal station 3 of the group B (B-3 in FIG. 3) located in the divided area "6", and the terminal station 3 of the group C (C-3 in FIG. 3) located in the divided area "15" as one set.

As described above, in a case where the divided areas are associated in a triangular shape, it is also assumed that there are overlapping divided areas such as (1, 3, 10) and (3, 10, 12). As the number of sets increases, the number of transmission opportunities allocated to one set decreases. Therefore, the set determination unit 232 may associate the divided areas in a triangular shape, create sets, and then determine a final set from the created sets. In the above example, the set determination unit 232 creates eight sets on the basis of the divided areas 1 to 16. The set determination unit 232 may determine a final set by excluding a set in which the terminal station 3 does not exist from the created eight sets.

The set determination unit 232 outputs information regarding each determined set to the transmission timing control unit 233. The information regarding each set includes identification information of the terminal stations 3 belonging to the set. The transmission timing control unit 233 determines different transmission timings for each set (step S109). Here, it is assumed that the transmission timing control unit 233 determines transmission timings as illustrated in FIG. 4.

Figure 4:
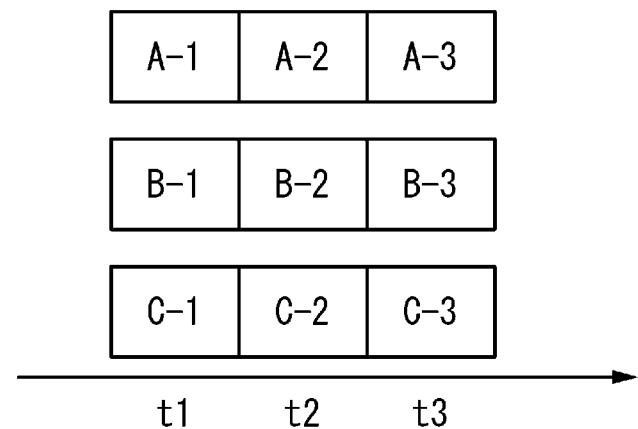
FIG. 4 is a diagram illustrating an example of a transmission timing according to the embodiment.

FIG. 4 is a diagram illustrating an example of a transmission timing according to the embodiment; In the example illustrated in FIG. 4, it is shown that, at time point t1, the terminal station 3 denoted by A-1, the terminal station 3 denoted by B-1, and the terminal station 3 denoted by C-1 perform data transmission within the same period. Similarly, it is shown that the terminal station 3 denoted by A-2, the terminal station 3 denoted by B-2, and the terminal station 3 denoted by C-2 perform data transmission within the same period at time point t2, and the terminal station 3 denoted by A-3, the terminal station 3 denoted by B-3, and the terminal station 3 denoted by C-3 perform data transmission within the same period at time point t3. As described above, the transmission timing control unit 233 determines transmission timings such that the terminal stations 3 belonging to the same group do not perform data transmission within the same period, and the terminal stations 3 of different groups separated by a certain distance perform data transmission within the same period.

Thereafter, the transmission timing control unit 233 generates transmission timing information including identification information of the set, identification information of the terminal stations 3 belonging to the set, and the transmission timing allocated to each set. The transmission timing control unit 233 outputs the generated transmission timing information to the transmission/reception units 221-1 to 221-N. The transmission/reception units 221-1 to 221-N transmit the transmission timing information as downlink signals within the communication ranges of the transmission/reception units 221-1 to 221-N (step S110).

The terminal stations 3-1 and 3-2 receive the downlink signals transmitted from the mobile relay station 2. In a case where the transmission timing information is included in the downlink signals transmitted from the mobile relay station 2, the transmission/reception units 32-1 and 32-2 output the downlink signals to the transmission control units 34-1 and 34-2. Each of the transmission control units 34-1 and 34-2 can ascertain which set the terminal station belongs to and at which timing data transmission is performed on the basis of the identification information of the set included in the transmission timing information, the identification information of the terminal station 3 belonging to the set, and the transmission timing allocated to each set.

The transmission control unit 34-1 causes the transmission/reception unit 32-1 to transmit the sensor data stored in the data storage unit 31-1 at the transmission timing included in the transmission timing information. The transmission/reception unit 32-1 transmits the sensor data under the control of the transmission control unit 34-1 (step S111).

The transmission control unit 34-2 causes the transmission/reception unit 32-2 to transmit the sensor data stored in the data storage unit 31-2 at the transmission timing included in the transmission timing information. The transmission/reception unit 32-2 transmits the sensor data under the control of the transmission control unit 34-2 (step S112). For example, in a case where transmission targets are allocated such that the terminal station 3-1 and the terminal station 3-2 perform data transmission at the same timing, the transmission/reception unit 32-2 transmits the sensor data at the same timing as the terminal station 3-1.

According to the wireless communication system 1 configured as described above, it is possible to suppress interference between uplink signals according to a simple method. Specifically, the mobile relay station 2 ascertains a position of each terminal station 3 from the position information transmitted from the terminal station 3. The mobile relay station 2 divides the area and groups the terminal stations 3 according to the divided areas in which the terminal stations 3 are located. Thereafter, the mobile relay station 2 determines, as a set that can perform simultaneous transmission, the terminal stations 3 separated between different groups, that is, the terminal stations 3 separated by a distance at which a correlation of channels is equal to or less than a threshold value. Consequently, even if the terminal stations 3 belonging to the determined set transmit data within the same period, since the correlation of the channels is equal to or less than the threshold value, separation is easily performed after reception. Therefore, interference can be suppressed only by using the position information of the terminal station 3 without being based on a channel correlation using CSI as in the related art. Thus, it is possible to suppress interference between uplink signals according to a simple method.

In the wireless communication system 1, the remotely disposed terminal station 3 can be determined in advance from the position information, and thus a resolution of beamforming can be improved without using a complicated feedback mechanism.

Unlike multiuser MIMO on the ground, it is easy to acquire position information of the terminal station 3 in satellite communication. Therefore, by selecting the terminal stations 3 at distant positions, it is possible to select the terminal stations 3 having a low correlation without being based on a channel correlation using CSI.

Hereinafter, a modification example of the wireless communication system 1 will be described.

In the above embodiment, the terminal station 3 includes the position information acquisition unit 33, and the position information acquisition unit 33 acquires position information. However, the position information may be registered in the terminal station 3 in advance at the time of installation. In such a configuration, the terminal station 3 does not have to include the position information acquisition unit 33. The terminal station 3 may receive a downlink signal from the mobile relay station 2 and then transmit a signal including the registered position information and an ID to the mobile relay station 2.

The mobile relay station 2 may be configured to obtain a diversity effect in a frequency direction by using different channels.

In a case where the downlink signal is transmitted, the mobile relay station 2 may perform data transmission at different timings for each set determined by the set determination unit 232. In such a configuration, the transmission timing control unit 233 performs data transmission on the terminal stations 3 belonging to the same set via the plurality of antennas 21-1 to 21-N within the same period. Consequently, data is transmitted to the terminal stations 3 belonging to the same set within the same period, and data is transmitted to the terminal stations 3 belonging to different sets at different timings. In the example of the embodiment, the terminal station 3 of the A group (A-1 in FIG. 3), the terminal station 3 of the B group (B-1 in FIG. 3) located in the divided area "7", and the terminal station 3 of the C group (C-1 in FIG. 3) located in the divided area "14" are the same set. Therefore, the mobile relay station 2 transmits downlink signals to the terminal station 3 of the A group (A-1 in FIG. 3), the terminal station 3 of the B group located in the divided area "7" (B-1 in FIG. 3), and the terminal station 3 of the C group located in the divided area "14" (C-1 in FIG. 3) within the same period. Here, the transmission timing control unit 233 may determine different transmission timings of the downlink signals for each set. As a result, the downlink signals can be transmitted at different timings for each set.

In the above embodiment, a case where a moving object on which the mobile relay station is mounted is an LEO satellite has been described. However, the moving object may be another flying object flying above, such as a geostationary satellite, a drone, or an HAPS.

In the embodiment described above, some or all processes (a grouping process, a set determination process, and a transmission timing control process) performed by the mobile relay station 2 and some or all processes performed by the terminal station 3 may be realized by a computer. In that case, a program for realizing these functions may be recorded on a computer-readable recording medium, and the program recorded on the recording medium may be read and executed by a computer system to realize the functions. The "computer system" mentioned herein includes an OS and hardware such as a peripheral device. The "computer-readable recording medium" refers to a portable medium such as a flexible disk, a magneto-optical disc, a ROM, or a CD-ROM, or a storage device such as a hard disk included in the computer system.

The "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. The above program may be for realizing some of the functions described above, may be one that can realize the functions described above in combination with a program already recorded in the computer system, or may be one realized by using a programmable logic device such as a field programmable gate array (FPGA).

Although embodiments of this invention have been described above in detail with reference to the Figures, specific configurations are not limited to these embodiments, and designs and so forth of a scope not departing from the essence of this invention are also included.

INDUSTRIAL APPLICABILITY

The present invention can be applied to technology of performing communication with a moving body in which a mobile relay station is installed.

REFERENCE SIGNS LIST

1 Wireless communication system
2 Mobile relay station
3 Terminal station
4 Base station
21-1 to 21-N Antenna
22 Terminal communication unit
23 Control unit
24 Base station communication unit
25 Antenna
31 Data storage unit
32 Transmission/reception unit
33 Position information acquisition unit
34 Transmission control unit
35 Antenna
41 Antenna
42 Transmission/reception unit
43 Base station signal reception processing unit
44 Terminal signal reception processing unit
221-1 to 221-N Transmission/reception unit
222-1 to 222-N Terminal signal demodulation unit
231 Classification unit
232 Set determination unit
233 Transmission timing control unit
241 Storage unit
242 Control unit
243 Transmission data modulation unit
244 Transmission/reception unit
441 Terminal signal demodulation unit
442 Terminal signal decoding unit

The invention claimed is:

1. A wireless communication system comprising: a plurality of communication apparatuses and a relay apparatus which is mobile, Wherein the relay apparatus includes
a classifier configured to group the plurality of communication apparatuses by using position information of each of the plurality of communication apparatuses,
a set determiner configured to determine a set of communication apparatuses that transmit and receive data within a same period, the set of communication apparatuses being determined from different groups,
a transmission timing controller configured to determine a transmission period for each determined set, and
a plurality of antennas that receive data transmitted from the plurality of communication apparatuses in the determined transmission period for each determined set, and
the plurality of communication apparatuses include
a communicator configured to transmit data to the relay apparatus within the transmission period for each set determined by the relay apparatus, wherein
the transmission timing controller determines a transmission period such that communication apparatuses belonging to the same group do not perform data transmission within the same period.

2. The wireless communication system according to claim 1, wherein
the classifier groups the plurality of communication apparatuses according to a distance between the communication apparatuses.

3. The wireless communication system according to claim 1, wherein
the classifier performs grouping by classifying a plurality of communication apparatuses in which a distance between the communication apparatuses is less than a threshold value into the same group, and classifying a plurality of communication apparatuses in which the distance between the communication apparatuses is equal to or more than the threshold value into different groups.

4. The wireless communication system according to claim 2, wherein
the classifier sets an area having a size including a place where the plurality of communication apparatuses are located, generates a plurality of divided areas by dividing the area with a size of a predetermined range, and determines the distance according to the divided area where each of the plurality of communication apparatuses is located.

5. The wireless communication system according to claim 1, wherein
in a case where the relay apparatus transmits data to the plurality of communication apparatuses, the plurality of antennas perform data transmission on communication apparatuses belonging to the same set within the same period.

6. A relay apparatus in a wireless communication system including a plurality of communication apparatuses and a relay apparatus which is mobile, the relay apparatus comprising:
- a classifier configured to group the plurality of communication apparatuses by using position information of each of the plurality of communication apparatuses;
- a set determiner configured to determine a set of communication apparatuses that transmit and receive data within a same period, the set of communication apparatuses being determined from different groups;
- a transmission timing controller configured to determine a transmission period for each determined set; and
- a plurality of antennas that receive data transmitted from the plurality of communication apparatuses in the determined transmission period for each determined set, wherein
- the transmission timing controller determines a transmission period such that communication apparatuses belonging to the same group do not perform data transmission within the same period.

7. A wireless communication method in a wireless communication system including a plurality of communication apparatuses and a relay apparatus which is mobile, the method comprising:
- causing the relay apparatus to group the plurality of communication apparatuses by using position information of each of the plurality of communication apparatuses;
- causing the relay apparatus to determine a set of communication apparatuses that transmit and receive data within a same period, the set of communication apparatuses being determined from different groups;
- causing the relay apparatus to determine a transmission period for each determined set;
- causing the plurality of communication apparatuses to transmit data to the relay apparatus within the transmission period for each set determined by the relay apparatus; and
- causing the relay apparatus to receive the data transmitted from the plurality of communication apparatuses in the determined transmission period for each set, wherein
- the causing the relay apparatus to determine a transmission period such that communication apparatuses belonging to the same group do not perform data transmission within the same period.

* * * * *